US012182929B2

(12) United States Patent
Weiss

(10) Patent No.: US 12,182,929 B2
(45) Date of Patent: Dec. 31, 2024

(54) SYSTEMS AND METHODS FOR VOLUME RECONSTRUCTIONS USING A PRIORI PATIENT DATA

(71) Applicant: Mazor Robotics Ltd., Caesarea (IL)

(72) Inventor: Noam Weiss, Haifa (IL)

(73) Assignee: Mazor Robotics Ltd., Caesarea (IL)

( * ) Notice: Subject to any disclaimer, the term of this patent is extended or adjusted under 35 U.S.C. 154(b) by 128 days.

(21) Appl. No.: 18/072,006

(22) Filed: Nov. 30, 2022

(65) Prior Publication Data
US 2024/0177402 A1 May 30, 2024

(51) Int. Cl.
*G06T 15/08* (2011.01)
*G06T 7/12* (2017.01)
*G06T 7/55* (2017.01)
*G06T 7/521* (2017.01)

(52) U.S. Cl.
CPC ............... *G06T 15/08* (2013.01); *G06T 7/12* (2017.01); *G06T 7/55* (2017.01); *G06T 7/521* (2017.01); *G06T 2207/10028* (2013.01); *G06T 2207/10081* (2013.01); *G06T 2207/10088* (2013.01); *G06T 2207/10116* (2013.01); *G06T 2207/30244* (2013.01)

(58) Field of Classification Search
CPC .. G06T 7/12; G06T 7/55; G06T 15/08; G06T 7/521; G06T 2207/10028; G06T 2207/10081; G06T 2207/30244; G06T 2207/10088; G06T 2207/10116; G06T 5/70; G06T 5/50; G06T 2207/10072; G06T 11/008
See application file for complete search history.

(56) References Cited

U.S. PATENT DOCUMENTS

| 5,739,539 A | 4/1998 | Wang et al. |
| 9,619,905 B2 | 4/2017 | Salomon et al. |
| 2006/0023966 A1* | 2/2006 | Vining ................... G06T 17/20 382/260 |

(Continued)

FOREIGN PATENT DOCUMENTS

WO    WO 2017/165835    9/2017

OTHER PUBLICATIONS

Fotouhi et al., "Can real-time RGBD enhance intraoperative Cone-Beam CT?," International Journal of Computer Assisted Radiology and Surgery, vol. 12, No. 7, Mar. 25, 2017, pp. 1211-1219.

(Continued)

*Primary Examiner* — Phi Hoang
(74) *Attorney, Agent, or Firm* — Sheridan Ross P.C.

(57) ABSTRACT

A system according to at least one embodiment of the present disclosure includes a processor; and a memory storing instructions thereon that, when executed by the processor, cause the processor to: identify, based on first imaging data associated with an object, a boundary region corresponding to a shape of the object; identify at least one voxel included in second imaging data associated with the object, where the at least one voxel is located outside the boundary region; and generate a multidimensional image volume corresponding to the object using the second imaging data, where generating the multidimensional image volume is with respect to one or more criteria associated with voxels located outside the boundary region.

20 Claims, 7 Drawing Sheets

(56) References Cited

U.S. PATENT DOCUMENTS

| | | | |
|---|---|---|---|
| 2010/0316270 A1 | 12/2010 | Erhard et al. | |
| 2011/0007980 A1 | 1/2011 | Fahimian et al. | |
| 2014/0371570 A1* | 12/2014 | Davis | A61B 6/482 600/407 |
| 2015/0213633 A1* | 7/2015 | Chang | A61N 5/1065 382/284 |
| 2017/0278281 A1* | 9/2017 | Schmitt | G06T 7/0012 |
| 2021/0012558 A1* | 1/2021 | Li | G06T 17/00 |
| 2023/0139841 A1* | 5/2023 | DiMarco | G06T 7/75 345/419 |

OTHER PUBLICATIONS

International Search Report and Written Opinion for International (PCT) Patent Application No. PCT/IL2023/051223, dated Mar. 15, 2024, 14 pages.

* cited by examiner

SYSTEMS AND METHODS FOR VOLUME RECONSTRUCTIONS USING A PRIORI PATIENT DATA

BACKGROUND

The present disclosure is generally directed to surgical data models, and relates more particularly to volume reconstruction processes.

Imaging devices may be used in the context of a surgery or surgical procedure. The imaging devices may include an emitter and a detector to capture an image of an object placed therebetween. The captured images may help a surgeon better carry out the surgery or surgical procedure.

BRIEF SUMMARY

Example aspects of the present disclosure include:

A system according to at least one embodiment of the present disclosure comprises: a processor; and a memory storing instructions thereon that, when executed by the processor, cause the processor to: identify, based on first imaging data associated with an object, a boundary region corresponding to a shape of the object; identify at least one voxel included in second imaging data associated with the object, wherein the at least one voxel is located outside the boundary region; and generate a multidimensional image volume corresponding to the object using the second imaging data, wherein generating the multidimensional image volume is with respect to one or more criteria associated with voxels located outside the boundary region.

Any of the features herein, wherein the instructions are further executable by the processor to: regenerate the first imaging data associated with the object based on a failure to satisfy the one or more criteria; identify, based on the regenerated first imaging data associated with the object, a second boundary region corresponding to the shape of the object; identify at least one second voxel included in third imaging data, wherein the at least one second voxel is located outside the second boundary region; and generate a second multidimensional image volume corresponding to the object using the third imaging data, wherein generating the second multidimensional image volume comprises satisfying one or more criteria associated with voxels located outside the second boundary region.

Any of the features herein, wherein the one or more criteria comprise a threshold attenuation value associated with voxels located outside the boundary region.

Any of the features herein, wherein the one or more criteria comprise a target ratio of attenuation of voxels located outside the boundary region to attenuation of voxels located inside the boundary region.

Any of the features herein, wherein the instructions are further executable by the processor to: identify, based on the second imaging data associated with the object, a second voxel located inside the boundary region, wherein the one or more criteria comprises satisfying a threshold difference between a first attenuation value of the at least one voxel and a second attenuation value of the second voxel.

Any of the features herein, wherein the first imaging data comprises one or more panoramic sagittal images of the object.

Any of the features herein, wherein: the first imaging data comprises one or more images including the object; an upper portion of the one or more images comprises a first air edge corresponding to a boundary of the object; and a lower portion of the one or more images comprises a second air edge corresponding to another boundary of the object.

Any of the features herein, wherein the instructions are further executable by the processor to: capture a set of points associated with the object using one or more light-based ranging operations; and generate the first imaging data associated with the object based on the set of points.

Any of the features herein, wherein the first imaging data comprises one or more x-ray images, one or more optical images, one or more depth images, one or more magnetic resonance imaging (MRI) images, one or more computed tomography (CT) images, or a combination thereof.

Any of the features herein, wherein the instructions are further executable by the processor to capture the first imaging data associated with the object, wherein capturing the first imaging data comprises: capturing a first image of the object, wherein capturing the first image is in association with first pose information of an imaging device with respect to the object; and capturing a second image of the object, wherein capturing the second image is in association with second pose information of the imaging device with respect to the object, and wherein identifying the boundary region corresponding to the shape of the object is based on the first image, the first pose information, the second image, the second pose information.

Any of the features herein, wherein dimensions of the boundary region correspond to at least one of: a dimension of the object in a first direction with respect to a plane; and a second dimension of the object in a second direction with respect to the plane, wherein the second direction is orthogonal to the first direction.

Any of the features herein, wherein the instructions are further executable by the processor to: dynamically capture the second imaging data using one or more imaging devices.

A system according to at least one embodiment of the present disclosure comprises: one or more imaging devices; a processor; and a memory storing data thereon that, when processed by the processor, cause the processor to: identify, based on first imaging data generated using the one or more imaging devices, a boundary region corresponding to a shape of an object; identify at least one voxel included in second imaging data generated using the one or more imaging devices, wherein the at least one voxel is located outside the boundary region; and generate a multidimensional image volume corresponding to the object using the second imaging data, wherein generating the multidimensional image volume is with respect to one or more criteria associated with voxels located outside the boundary region.

Any of the features herein, wherein the data are further executable by the processor to: regenerate the first imaging data in response to a failure to satisfy the one or more criteria; identify, based on the regenerated first imaging data, a second boundary region corresponding to the shape of the object; identify at least one second voxel included in third imaging data, wherein the at least one second voxel is located outside the second boundary region; and generate a second multidimensional image volume corresponding to the object using the third imaging data, wherein generating the second multidimensional image volume comprises satisfying one or more criteria associated with voxels located outside the second boundary region.

Any of the features herein, wherein the one or more criteria comprise a threshold attenuation value associated with voxels located outside the boundary region.

Any of the features herein, wherein the one or more criteria comprise a target ratio of attenuation of the voxels located outside the boundary region to attenuation of voxels located inside the boundary region.

Any of the features herein, wherein the data are further executable by the processor to: identify, based on the second imaging data associated with the object, a second voxel located inside the boundary region, wherein the one or more criteria comprises a threshold difference between a first attenuation value of the at least one voxel and a second attenuation value of the second voxel.

Any of the features herein, wherein the first imaging data comprises one or more panoramic sagittal images of the object.

Any of the features herein, wherein: the first imaging data comprises one or more images including the object; an upper portion of the one or more images comprises a first air edge corresponding to a boundary of the object; and a lower portion of the one or more images comprises a second air edge corresponding to another boundary of the object.

A method according to at least one embodiment of the present disclosure comprises:
 identifying, based on first imaging data associated with an object, a boundary region corresponding to a shape of the object; identifying at least one voxel included in second imaging data associated with the object, wherein the at least one voxel is located outside the boundary region; and generating a volumetric construction corresponding to the object using the second imaging data, wherein generating the volumetric construction is with respect to satisfying one or more criteria associated with voxels located outside the boundary region.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/implementations in combination with any one or more other aspects/features/implementations.

Use of any one or more of the aspects or features as disclosed herein.

It is to be appreciated that any feature described herein can be claimed in combination with any other feature(s) as described herein, regardless of whether the features come from the same described implementation.

The details of one or more aspects of the disclosure are set forth in the accompanying drawings and the description below. Other features, objects, and advantages of the techniques described in this disclosure will be apparent from the description and drawings, and from the claims.

The preceding is a simplified summary of the disclosure to provide an understanding of some aspects of the disclosure. This summary is neither an extensive nor exhaustive overview of the disclosure and its various aspects, implementations, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, implementations, and configurations of the disclosure are possible utilizing, alone or in combination, one or more of the features set forth above or described in detail below.

Numerous additional features and advantages of the present disclosure will become apparent to those skilled in the art upon consideration of the implementation descriptions provided hereinbelow.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, implementations, and configurations of the disclosure, as illustrated by the drawings referenced below.

DETAILED DESCRIPTION

Figure 1:
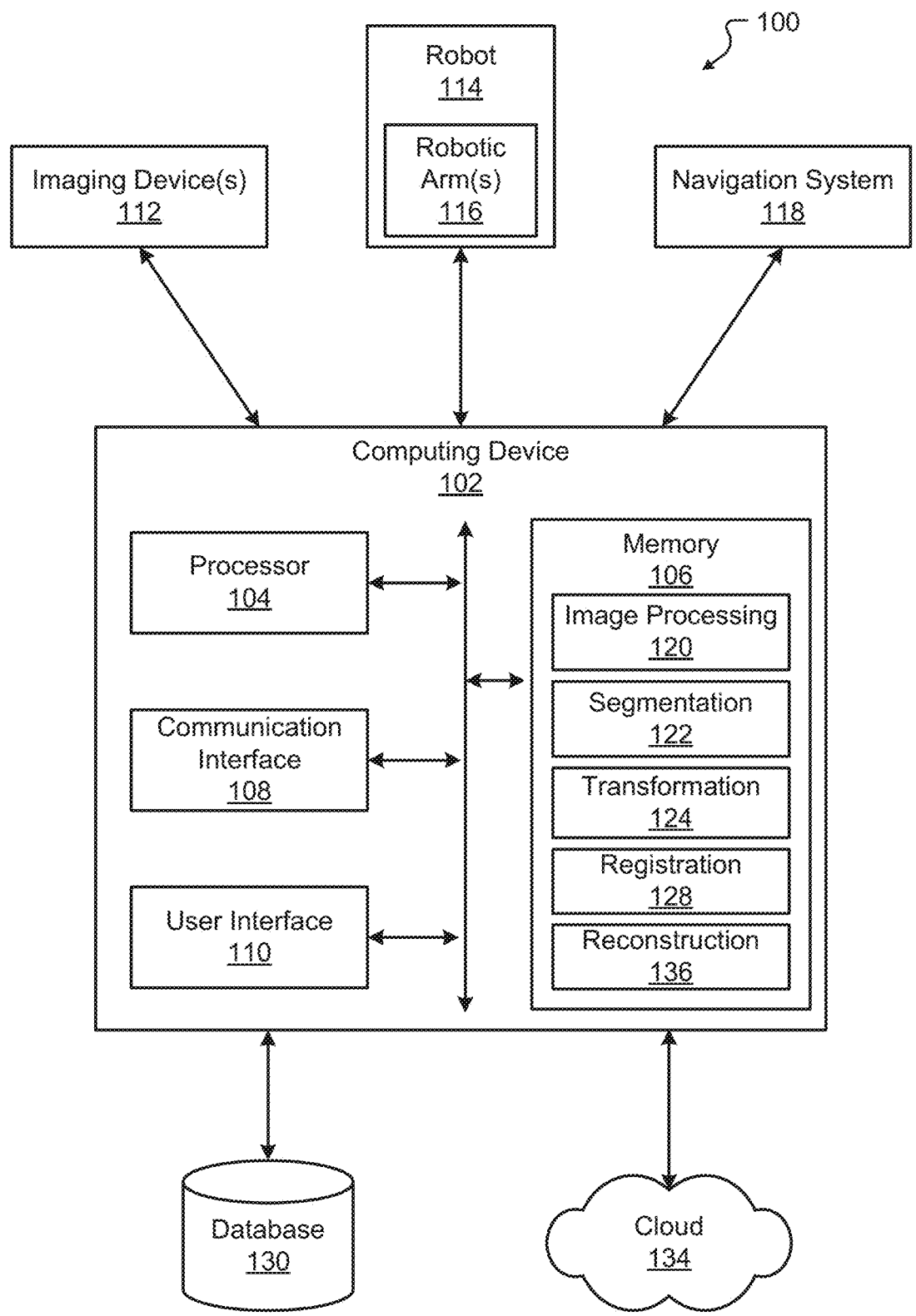
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or implementation, certain acts or events of any of the processes or methods described herein may be performed in a different sequence, and/or may be added, merged, or left out altogether (e.g., all described acts or events may not be necessary to carry out the disclosed techniques according to different implementations of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any implementations of the disclosure are explained in detail, it is to be understood that the disclosure is not limited in its application to the details of construction and the arrangement of components set forth in the following description or illustrated in the drawings. The disclosure is capable of other implementations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof unless explicitly stated otherwise, the use or listing of one or more examples (which may be denoted by "for example," "by way of example," "e.g.," "such as," or similar language) is not intended to and does not limit the scope of the present disclosure.

The terms proximal and distal are used in this disclosure with their conventional medical meanings, proximal being closer to the operator or user of the system, and further from the region of surgical interest in or on the patient, and distal being closer to the region of surgical interest in or on the patient, and further from the operator or user of the system.

Reconstruction processes, such as an X-ray three-dimensional (3D) volume reconstruction or single 2D image reconstruction, may be used to generate an accurate 3D model or 2D model (e.g., a 2D slice) of a scanned object or patient. Inaccurate reconstructions may result in erroneous sizes, erroneous values, or other image deformities. The inaccurate reconstructions may occur due to less than optimal reconstruction parameters, reconstruction algorithm, or conditions. Inaccurate reconstructions may lead to incorrect diagnosis and prognosis.

When an iterative method of adjusting the 2D single image or volume reconstruction is used, one potential issue is determining how to improve the reconstruction output (either volume or a 2D image) from one iteration to the next. The reconstruction output from the iterative method may include a 3D matrix made out of voxels, with each voxel mapping a value to a small portion of 3D data (e.g., a "cube") in 3D space. In the case of a single 2D image, instead of 3D cube, one would have 2D pixel as a small portion of data. In embodiments where X-ray imaging is implemented, the values may be attenuation values. In some iterative reconstruction methods, such as Algebraic Reconstruction Technique (ART), Maximum-Likelihood Expectation Maximization (MLEM), or Ordered Subset Expectation Maximization (OSEM), the voxels with attenuation values may be shifted into different voxels, while keeping the sum of all voxels fixed. In other words, the values associated with one or more voxels may be decreased while values associated with one or more other voxels may be increased, such that there is no overall change in the sum of all the voxels.

Another potential issue with volume reconstruction is the use of small detectors, which can result in less information about peripheral parts of the patient (since the body is too large to be seen entirely by the detector). One potential remedy is the use of Computed Tomography (CT) scanners that include large detectors or taking many additional images with the small detector. However, such a solution also exposes the patient to increased doses of radiation, since the source and detector must be large enough to capture the peripheral parts of the patient.

Another potential issue with volume or single 2D image reconstruction is the dissipation of attenuation values from the body contours of the patient to the surrounding air. This could result in reduced contrast in the image, a lack of consistency in gray level values, and other image artifacts.

In accordance with at least one embodiment of the present disclosure, an a priori size estimation of the volume of the patient could beneficially improve the reconstruction, such as by improving the quality of the reconstruction, the accuracy of the reconstruction, and/or the time needed to perform the reconstruction. For example, the size estimation may be used as an initial guess in the algorithm instead of a random initial guess. The use of the size estimation may provide a more accurate starting point for the algorithm for optimizing the reconstruction. Moreover, the use of the size estimation may result in a better quality image. For example, by providing a boundary, the algorithm may be constrained by the boundary to reconstruct the image with the same general aspects of the size estimation, resulting in a more accurately reconstructed image. The a priori size estimation would help keep the air volume around the patient free of attenuation, while confining the attenuation to the patient (or, more generally, to the object itself).

In accordance with at least one embodiment of the present disclosure, different methods and sources of information are used to achieve a priori size estimation. For example, information associated with a previous CT scan, magnetic resonance image (MRI) scan, or the like may be retrieved. As another example, one or more devices (e.g., an optical camera, a depth camera, a Light Detecting and Ranging (LIDAR) camera, or any other imaging modality or measuring device) may be used to capture information used to generate a volumetric mesh around the patient. As yet another example, the a priori size information may be generated based on planning scans (e.g., scans taken of the patient during a preoperative planning phase) that can be used to find the boundaries of the patient body (e.g., by estimating the width and height of the patient). The size estimation may be integrated into a reconstruction algorithm in the form of a condition that limits the voxel values outside the body. For example, the condition on the voxel values may be such that voxels located outside the boundary cannot have values that are not attributed to air (or, more generally, values that are not attributed to the medium surrounding the object). Such conditions on the voxels outside the boundary may beneficially enable the algorithm to better shift attenuation values between the voxels while iteratively reconstructing the volume by, for example, capping the values of the voxels located outside the boundary, resulting in improved quality of the final image. the improved final image may also beneficially improve procedure planning, reduce the patient's exposure to potentially hazardous radiation (e.g., excessive X-ray imaging), and improve clinical outcomes.

Implementations of the present disclosure provide technical solutions to one or more of the problems of (1) generating erroneous or inaccurate reconstructions, (2) attenuation leakage in reconstructed images into surrounding non-patient areas, and (3) erroneous or inaccurate gray-level value shifting during iterative volumetric reconstructions.

FIG. 1 illustrates an example of a system 100 that supports aspects of the present disclosure.

The system 100 includes a computing device 102, one or more imaging devices 112, a robot 114, a navigation system 118, a database 130, and/or a cloud network 134 (or other network). Systems according to other implementations of the present disclosure may include more or fewer components than the system 100. For example, the system 100 may omit and/or include additional instances of one or more components of the computing device 102, the imaging device(s) 112, the robot 114, navigation system 118, the database 130, and/or the cloud network 134. For example, the system 100 may omit the robot 114 and the navigation system 118. The system 100 may support the implementation of one or more other aspects of one or more of the methods disclosed herein.

The computing device 102 includes a processor 104, a memory 106, a communication interface 108, and a user interface 110. Computing devices according to other implementations of the present disclosure may include more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging devices 112, the robot 114, the navigation system 118, the database 130, and/or the cloud network 134.

The memory 106 may be or include RAM, DRAM, SDRAM, other solid-state memory, any memory described herein, or any other tangible, non-transitory memory for storing computer-readable data and/or instructions. The memory 106 may store information or data associated with completing, for example, any step of the methods 400 and 500 described herein, or of any other methods. The memory 106 may store, for example, instructions and/or machine learning models that support one or more functions of the imaging devices 112, the robot 114, and the navigation system 118. For instance, the memory 106 may store content (e.g., instructions and/or machine learning models) that, when executed by the processor 104, enable image processing 120, segmentation 122, transformation 124, registration 128, and/or reconstruction 136. Such content, if provided as in instruction, may, in some implementations, be organized into one or more applications, modules, packages, layers, or engines.

Alternatively or additionally, the memory 106 may store other types of content or data (e.g., machine learning models, artificial neural networks, deep neural networks, etc.) that can be processed by the processor 104 to carry out the various method and features described herein. Thus, although various contents of memory 106 may be described as instructions, it should be appreciated that functionality described herein can be achieved through use of instructions, algorithms, and/or machine learning models. The data, algorithms, and/or instructions may cause the processor 104 to manipulate data stored in the memory 106 and/or received from or via the imaging devices 112, the robot 114, the navigation system 118, the database 130, and/or the cloud network 134.

The computing device 102 may also include a communication interface 108. The communication interface 108 may be used for receiving data or other information from an external source (e.g., the imaging devices 112, the robot 114, the navigation system 118, the database 130, the cloud network 134, and/or any other system or component separate from the system 100), and/or for transmitting instructions, data (e.g., image data, measurements, etc.), or other information to an external system or device (e.g., another computing device 102, the imaging devices 112, the robot 114, the navigation system 118, the database 130, the cloud network 134, and/or any other system or component not part of the system 100). The communication interface 108 may include one or more wired interfaces (e.g., a USB port, an Ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some implementations, the communication interface 108 may support communication between the device 102 and one or more other processors 104 or computing devices 102, whether to reduce the time needed to accomplish a computing-intensive task or for any other reason.

The computing device 102 may also include one or more user interfaces 110. The user interface 110 may be or include a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some implementations, the user interface 110 may support user modification (e.g., by a surgeon, medical personnel, a patient, etc.) of instructions to be executed by the processor 104 according to one or more implementations of the present disclosure, and/or to user modification or adjustment of a setting of other information displayed on the user interface 110 or corresponding thereto.

In some implementations, the computing device 102 may utilize a user interface 110 that is housed separately from one or more remaining components of the computing device 102. In some implementations, the user interface 110 may be located proximate one or more other components of the computing device 102, while in other implementations, the user interface 110 may be located remotely from one or more other components of the computer device 102.

The imaging device 112 may be operable to image anatomical feature(s) (e.g., a bone, veins, tissue, etc.) and/or other aspects of patient anatomy to yield image data (e.g., image data depicting or corresponding to a bone, veins, tissue, etc.). "Image data" or "imaging data" as used herein refers to the data generated or captured by an imaging device 112, including in a machine-readable form, a graphical/visual form, and in any other form. In various examples, the image data may include data corresponding to an anatomical feature of a patient, or to a portion thereof. The image data may be or include a preoperative image, an intraoperative image, a postoperative image, or an image taken independently of any surgical procedure. In some implementations, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or include, for example, an ultrasound scanner (which may include, for example, a physically separate transducer and receiver, or a single ultrasound transceiver), an O-arm, a C-arm, a G-arm, or any other device utilizing X-ray-based imaging (e.g., a fluoroscope, a CT scanner, or other X-ray machine), a magnetic resonance imaging (MRI) scanner, an optical coherence tomography (OCT) scanner, an endoscope, a microscope, an optical camera, a thermographic camera (e.g., an infrared camera), a radar system (which may include, for example, a transmitter, a receiver, a processor, and one or more antennae), or any other imaging device 112 suitable for obtaining images of an anatomical feature of a patient. The imaging device 112 may be contained entirely within a single housing, or may include a transmitter/emitter and a receiver/detector that are in separate housings or are otherwise physically separated.

In some implementations, the imaging device 112 may include more than one imaging device 112. For example, a first imaging device may provide first image data and/or a first image, and a second imaging device may provide second image data and/or a second image. In still other implementations, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or include, for example, the Mazor X™ Stealth Edition robotic guidance system. The robot 114 may be configured to position the imaging device 112 at one or more precise position(s) and orientation(s), and/or to return the imaging device 112 to the same position(s) and orientation(s) at a later point in time. The robot 114 may additionally or alternatively be configured to manipulate a surgical tool (whether based on guidance from the navigation system 118 or not) to accomplish or to assist with a surgical task. In some implementations, the robot 114 may be configured to hold and/or manipulate an anatomical element during or in connection with a surgical procedure. The robot 114 may include one or more robotic arms 116. In some implementations, the robotic arm 116 may include a first robotic arm and a second robotic arm, though the robot 114 may include more than two robotic arms. In some implementations, one or more of the robotic arms 116 may be used to hold and/or maneuver the imaging device 112. In implementations where the imaging device 112 includes two or more physically separate components (e.g., a transmitter and receiver), one robotic arm 116 may hold one such component, and another robotic arm 116 may hold another such component. Each robotic arm 116 may be positionable independently of the other robotic arm. The robotic arms 116 may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may include one or more sensors that enable the processor 104 (or a processor of the robot 114) to determine a precise pose in space of the robotic arm (as well as any object or element held by or secured to the robotic arm).

In some implementations, reference markers (e.g., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some implementations, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some implementations, the navigation system 118 may include one or more electromagnetic sensors. In various implementations, the navigation system 118 may be used to track a position and orientation (e.g., a pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some implementations, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The processor 104 may utilize data stored in memory 106 as a neural network. The neural network may include a machine learning architecture. In some aspects, the neural network may be or include one or more classifiers. In some other aspects, the neural network may be or include any machine learning network such as, for example, a deep learning network, a convolutional neural network, a reconstructive neural network, a generative adversarial neural network, or any other neural network capable of accomplishing functions of the computing device 102 described herein. Some elements stored in memory 106 may be described as or referred to as instructions or instruction sets, and some functions of the computing device 102 may be implemented using machine learning techniques.

For example, the processor 104 may support machine learning model(s) in the form of reconstruction 136 which may be trained and/or updated based on training data provided or accessed by any of the computing device 102, the imaging device 112, the robot 114, the navigation system 118, the database 130, and/or the cloud network 134.

In some embodiments, the reconstruction may be trained with one or more training sets included in the training data 146. In some aspects, the training data 146 may include multiple training sets. In an example, the training data 146 may include a first training set that includes depth data and/or motion data associated with one or more medical conditions described herein. In an example, the depth data and/or motion data included in the training set may be indicative of changes in breathing or bodily motion indicative of the one or more medical conditions. In some aspects, the depth data and/or motion data included in the training set may be associated with confirmed instances (e.g., by a healthcare provider, a patient, etc.) of the one or more medical conditions.

In other embodiments, the reconstruction 136 may provide one or more algorithms, such as ART, MLEM, OSEM, Filtered Back Projection (FBP), combinations thereof, and the like for reconstructing a multidimensional image that represents the patient (e.g., a 3D image that represents the volume of the patient). In such embodiments, and as further discussed below, the algorithm may utilize a priori patient size estimation data (e.g., based on previous scans retrieved from the database 130, based on boundaries determined from preliminary scans, based on a mesh, etc.) to provide criteria for the reconstruction algorithm. In some embodiments, the criteria may be used as constraints that are used to influence the algorithm's optimization of the multidimensional image. For example, based on the patient size estimation, the algorithm may evaluate and optimize voxels classified by the algorithm as outside the patient (e.g., voxels associated with air around the patient) differently than voxels classified by the algorithm as inside the patient (e.g., voxels associated with patient tissues). In some embodiments, the reconstruction 136 may receive multiple different image data types, and use the image types as the patient size estimation when generating the multidimensional image. For example, the reconstruction 136 may receive LIDAR data and CT scans, and may convert the LIDAR image data and the CT scans into a format (e.g., 3D coordinates, 3D mesh, etc.) that can be processed by the reconstruction 136. In some embodiments, the image data types may be converted into a common imaging plane (e.g., using registration 128) before being passed into the reconstruction 136.

The database 130 may store information that correlates one coordinate system to another (e.g., one or more robotic coordinate systems to a patient coordinate system and/or to a navigation coordinate system). The database 130 may additionally or alternatively store, for example, one or more surgical plans (including, for example, pose information about a target and/or image information about a patient's anatomy at and/or proximate the surgical site, for use by the robot 114, the navigation system 118, and/or a user of the computing device 102 or of the system 100); one or more images useful in connection with a surgery to be completed by or with the assistance of one or more other components of the system 100; and/or any other useful information. In some embodiments, the database 130 may comprise patient information that can be used in estimating a patient size. For example, the database 130 may store patient data (e.g., patient height, patient weight, etc.) and/or imaging data associated with the patient (e.g., previous scans or images of the patient) that can be used in estimating the patient's size.

The database 130 may be configured to provide any such information to the computing device 102 or to any other device of the system 100 or external to the system 100, whether directly or via the cloud network 134. In some implementations, the database 130 may be or include part of a hospital image storage system, such as a picture archiving and communication system (PACS), a health information system (HIS), and/or another system for collecting, storing, managing, and/or transmitting electronic medical records including image data.

In some aspects, the computing device 102 may communicate with a server(s) and/or a database (e.g., database 130) directly or indirectly over a communications network (e.g., the cloud network 134). The communications network may include any type of known communication medium or collection of communication media and may use any type of protocols to transport data between endpoints. The communications network may include wired communications technologies, wireless communications technologies, or any combination thereof.

Wired communications technologies may include, for example, Ethernet-based wired local area network (LAN) connections using physical transmission mediums (e.g., coaxial cable, copper cable/wire, fiber-optic cable, etc.). Wireless communications technologies may include, for example, cellular or cellular data connections and protocols (e.g., digital cellular, personal communications service (PCS), cellular digital packet data (CDPD), general packet radio service (GPRS), enhanced data rates for global system for mobile communications (GSM) evolution (EDGE), code division multiple access (CDMA), single-carrier radio transmission technology (1×RTT), evolution-data optimized (EVDO), high speed packet access (HSPA), universal mobile telecommunications service (UMTS), 3G, long term evolution (LTE), 4G, and/or 5G, etc.), Bluetooth®, Bluetooth® low energy, Wi-Fi, radio, satellite, infrared connections, and/or ZigBee® communication protocols.

The Internet is an example of the communications network that constitutes an Internet Protocol (IP) network consisting of multiple computers, computing networks, and other communication devices located in multiple locations, and components in the communications network (e.g., computers, computing networks, communication devices) may be connected through one or more telephone systems and other means. Other examples of the communications network may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the communications network may include of any combination of networks or network types. In some aspects, the communications network may include any combination of communication mediums such as coaxial cable, copper cable/wire, fiber-optic cable, or antennas for communicating data (e.g., transmitting/receiving data).

The computing device 102 may be connected to the cloud network 134 via the communication interface 108, using a wired connection, a wireless connection, or both. In some implementations, the computing device 102 may communicate with the database 130 and/or an external device (e.g., a computing device) via the cloud network 134.

The system 100 or similar systems may be used, for example, to carry out one or more aspects of any of the methods 400 and 500 described herein. The system 100 or similar systems may also be used for other purposes.

In some embodiments, the system 100 may be used to generate patient size estimations for the purposes of improving quality of a reconstructed volume model of the patient. The reconstructed volume model (also referred to herein as a reconstructed image, a reconstructed multidimensional image, or a reconstructed volume) may be a 2D or a 3D model based at least partially on a captured image (e.g., an image generated by the imaging device 112), and may provide information associated with the volume occupied by the patient, the pose (e.g., position and/or orientation) of the patient, combinations thereof, and the like. The reconstructed volume model may be generated by the computing device 102 using the captured image. The reconstructed volume model may model the entirety of the patient or, in some instances, a portion of the patient (e.g., one or more vertebrae of the patient, other anatomical elements or tissues of the patient, etc.). In some embodiments, the reconstructed volume model may be a 2D model (e.g., an area) and/or may depict a 2D slice of the overall reconstructed volume model. The computing device 102 may access one or more algorithms or data models (e.g., ART, FBP, trained data models, etc.) from the memory 106 in reconstructing the multidimensional image based on information associated with the captured image of the patient.

In some implementations, a priori data related to estimations of the patient's size, shape, volume, and/or boundaries associated with the patient may be passed into the algorithms or data models to provide one or more criteria (e.g., a constraint) the reconstruction must satisfy. For example, boundaries associated with the body of the patient may be passed into algorithms or data models, and a criterion for the reconstruction may be that voxels located outside of the boundary of the patient cannot increase in their attenuation values. As another example, voxels located outside the boundary cannot have an attenuation value above a threshold value. The patient size estimations may be generated based on previous images of the patient (e.g., previously captured CT scans, MRI scans, etc.), based on a mesh of patient anatomy, and/or based on images captured during a preoperative scanning procedure, as discussed further with reference to FIGS. 2A-2E.

Figure 2A:
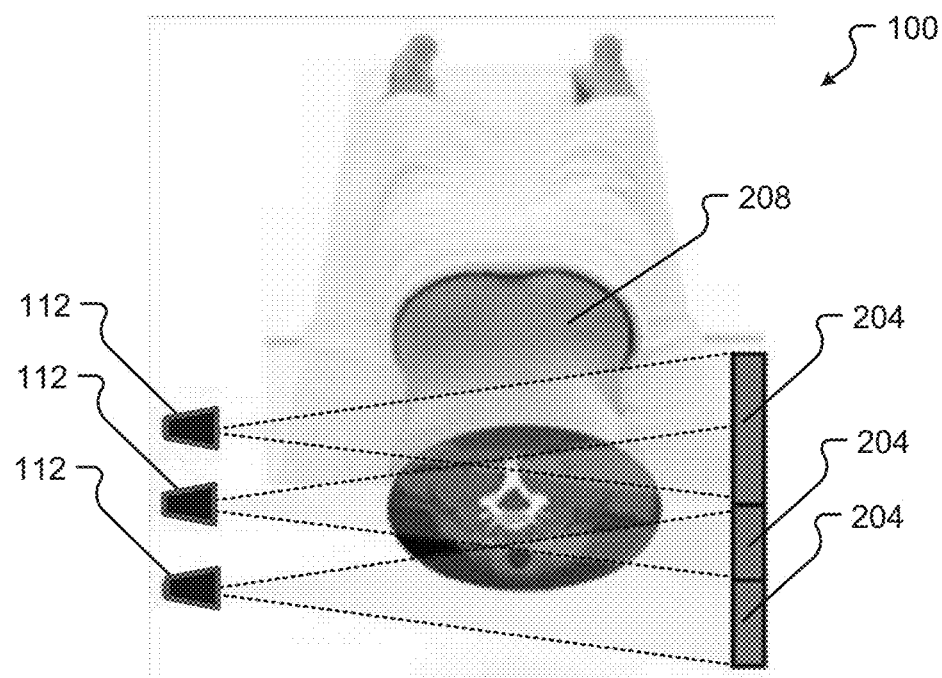
FIG. 2A depicts a first imaging technique of a patient according to at least one embodiment of the present disclosure.
Figure 2B:
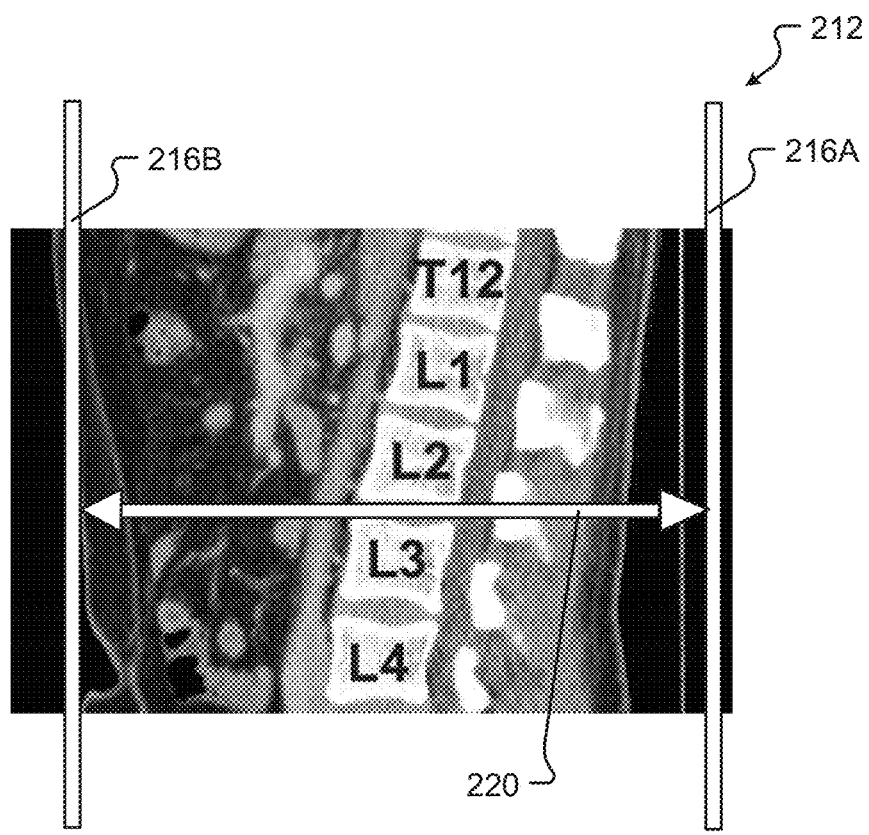
FIG. 2B is a first image generated with the first imaging technique according to at least one embodiment of the present disclosure.

Turning next to FIGS. 2A-2B, aspects of a first imaging technique according to at least one embodiment of the present disclosure are shown. FIG. 2A illustrates the one or more imaging devices 112 disposed proximate (e.g., on either side of, next to, etc.) a patient 208 and each configured to emit energy (e.g., X-rays, non-ionizing radiation, etc.) that can be collected by detectors 204. While three imaging devices 112 and three detectors 204 are illustrated, additional or alternative numbers of imaging devices 112 and/or detectors 204 may be used. Additionally, the patient 208 may be positioned in a variety of different orientations, and the patient does not need to be in the supine position as depicted in FIG. 2A. For example, the patient 208 may be in a prone position with the imaging devices 112 on a first side of the patient and the detectors 204 on a second side of the patient opposite the first side. As another example, the patient may be standing, with the imaging devices 112 on a first side of the patient and the detectors 204 on a second side of the patient opposite the first side. The energy measured by the detectors 204 may be used by the processor 104 (e.g., using image processing 120) to generate an image 212 of the patient 208, as illustrated in FIG. 2B. The image 212 may depict one or more anatomical elements of the patient 208 (e.g., vertebrae). The image 212 may be or comprise various types of images, based on the type of imaging device used in capturing the image 212. The image 212 may be or comprise, for example, a CT image (e.g., when the imaging devices 112 comprise X-ray emitters), an optical image (e.g., when the imaging devices 112 emit non-ionizing radiation), a depth image (e.g., when the imaging devices 112 comprise LIDAR cameras), and/or an MRI image (e.g., when the imaging devices 112 generate magnetic fields).

The processor 104 may use one or more algorithms or data models (e.g., image processing 120, segmentation 122) to identify boundaries 216A, 216B between the patient (or portions thereof such as patient anatomy) and environment surrounding the patient as depicted in the image 212. For example, the segmentation 122 may be or comprise an edge detection algorithm that identifies a change in pixel value above a threshold value to identify the boundary between the patient anatomy and the environment surrounding the patient anatomy. As illustrated in FIG. 2B, the boundaries 216A and 216B may be the boundaries identified by the edge detection algorithm. In other embodiments, the segmentation 122 may be or comprise a neural network or other data model trained on similar images to the image 212 and configured to receive the image 212 and identify the boundaries 216A and 216B between the patient and the patient's environment (e.g., air around the patient).

The processor 104 may also calculate a thickness 220 of the patient 208 based on the distance between the boundaries 216A, 216B. While the term "thickness" is used herein, it is to be understood that the thickness is a general distance between one side of the patient and another side of the patient in any spatial direction, and may alternatively be described as a height, width, depth, or the like. In some embodiments, the processor 104 may use transformations 124 to map a relative distance between the image data (e.g., pixel values) associated with the boundaries 216A, 216B to a relative thickness 220 of the patient 208. In other words, the transformations 124 may convert a distance between pixel values in the image 212 into a real-world distance measurement corresponding to the thickness 220. The determined thickness 220 may be used in one or more criteria when the computing device 102 generates the reconstructed volume model of the patient.

Figure 2C:
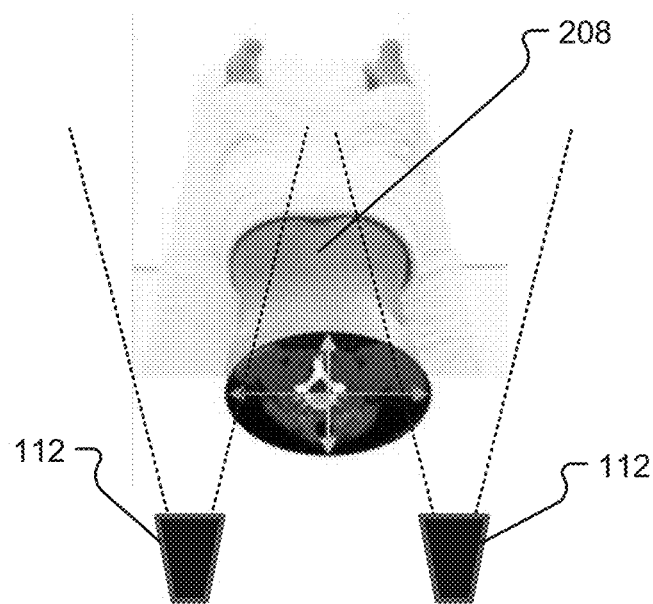
FIG. 2C depicts a second imaging technique of the patient according to at least one embodiment of the present disclosure.
Figure 2D:
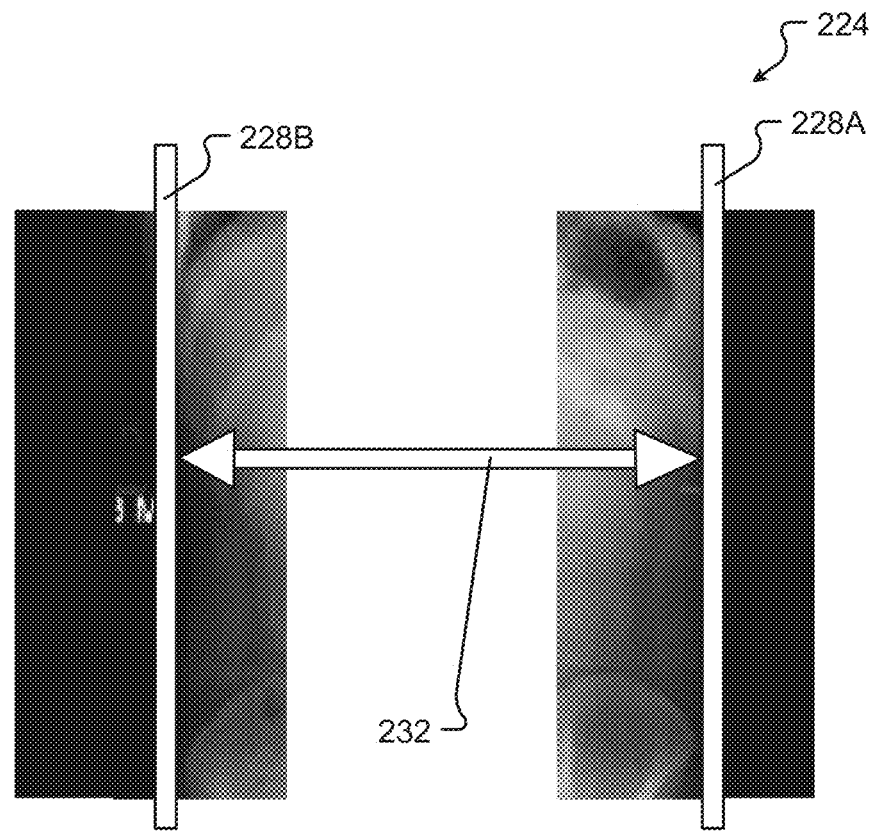
FIG. 2D is a second image generated with the second imaging technique according to at least one embodiment of the present disclosure.

FIGS. 2C-2D illustrate aspects of a second imaging technique according to at least one embodiment of the present disclosure. The second imaging technique may include placing the imaging devices 112 such that energy (e.g., X-rays, non-ionizing radiation, etc.) emitted from the imaging devices 112 is emitted along the length of the patient 208 and captured by detectors (not shown). In some embodiments, multiple images of the patient may be captured when the imaging devices are positioned in different poses. The energy measured by the detectors may be used by the processor 104 (e.g., using image processing 120) to generate an image 224 of the patient 208, as depicted in FIG. 2D. The image 224 may depict one or more anatomical elements of the patient 208 (e.g., vertebrae). In some embodiments, the image 224 may be similar to the image 212, but may depict the anatomical elements of the patient 208 from different angles or directions than the image 212. In some embodiments, the imaging devices 112 may be aligned perpendicular to the imaging devices 112 positioned in FIG. 2A, such that the image 212 depicts the patient along or with respect to a first direction, while the image 224 depicts the patient along a second direction perpendicular to the first direction. The image 224 may be or comprise a CT image (e.g., when the imaging devices 112 comprise X-ray emitters), an optical image (e.g., when the imaging devices 112 emit non-ionizing radiation), a depth image (e.g., when the imaging devices 112 comprise LIDAR cameras), and/or an MRI image (e.g., when the imaging devices 112 generate magnetic fields).

The processor 104 may use one or more algorithms or data models (e.g., image processing 120, segmentation 122) to identify boundaries 228A, 228B between the patient (or portions thereof such as patient anatomy) and environment surrounding the patient depicted in the image 224. For example, the segmentation 122 may be or comprise an edge detection algorithm that identifies a change in pixel value above a threshold to identify the boundary between the patient anatomy and the environment surrounding the patient anatomy. As shown in FIG. 2D, the boundaries 228A and 228B may be the boundaries identified by the edge detection algorithm. In other embodiments, the segmentation 122 may be or comprise a neural network or other data model trained on similar images to the image 224 and configured to receive the image 224 and identify the boundaries 228A and 228B between the patient and the patient's environment (e.g., air around the patient).

The processor 104 may also calculate a width 232 of the patient 208 based on the distance between the boundaries 228A, 228B. While the term "width" is used herein, it is to be understood that the term "width" is used to reference a physical distance or dimension between one side of the patient and another side of the patient in any spatial direction, and may alternatively be described as a height, thickness, depth, or the like. In some embodiments, the processor 104 may use transformations 124 to map a relative distance between the image data (e.g., distance between pixel values) associated with the boundaries 228A, 228B to a relative width 232 of the patient 208. Stated differently, the transformations 124 may convert a distance between pixel values in the image 224 into a real-world distance measurement corresponding to the width 232. In embodiments where the patient is imaged in multiple different poses (or, similarly, when the patient remains fixed but the imaging devices 112 capture image data while in different poses relative to the patient), the processor 104 may use registration 128 to map the image data from the different poses into a common coordinate system before determining the width 232. The registration 128 may be or comprise an algorithm that receives pose information related to the imaging device for each depicted angle in the image 224, and uses the pose information to map the pixel values to a common coordinate system, such that both the boundaries 228A, 228B reflect pixel values in the common coordinate system. The determined width 232 may be used in one or more criteria when the computing device 102 generates the reconstructed volume model of the patient.

In some embodiments, both the thickness 220 and the width 232 may be used to determine boundary conditions for the patient in the reconstructed volume. For example, the thickness 220 may provide a first dimension of the patient with respect to a plane, and the width 232 may provide a second, orthogonal (e.g., perpendicular) dimension of the patient with respect to the plane, creating a shape (e.g., a rectangle, a square, a cube, a cuboid, etc.) that can be used to represent an estimation of the space occupied by the patient. Additionally or alternatively, the thickness 220 and/or the width 232 may each comprise a plurality of separate thickness and/or width measurements, respectively, such that the shape created based on the thickness 220 and the width 232 form a shell representing the outer boundary of the patient 208. The boundary that forms the shape may be used as the one or more criteria for the reconstructed volume model of the patient, as discussed in further detail below.

Figure 2E:
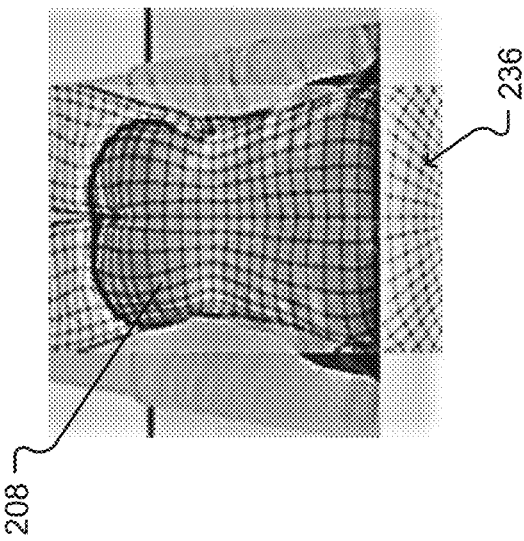
FIG. 2E depicts a third imaging technique of the patient according to at least one embodiment of the present disclosure.
Figure 2F:
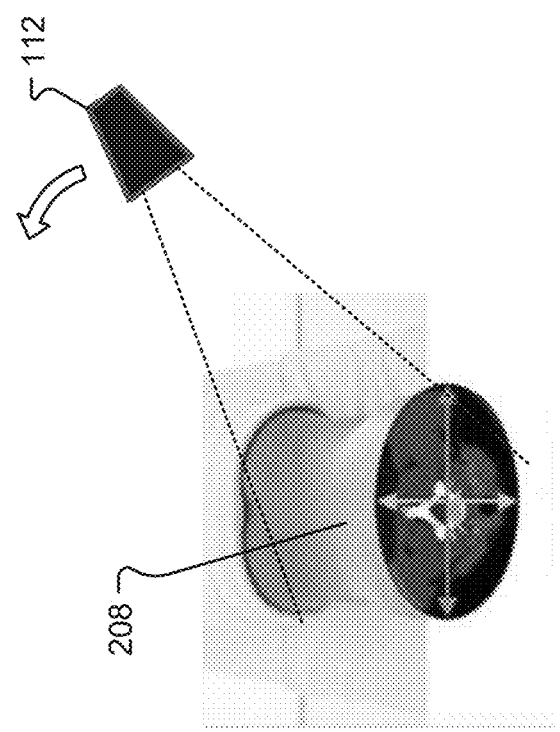
FIG. 2F depicts a mesh according to at least one embodiment of the present disclosure.

FIGS. 2E-2F illustrate aspects of techniques for generating a mesh 236 of patient anatomy according to at least one embodiment of the present disclosure. The mesh 236 may depict the overall shape and/or the outer boundary of the patient 208. As shown in FIG. 2E, the imaging device 112 may be moved relative to the patient 208 to capture image data of the patient at different angles or poses. The imaging device 112 may be panned and/or circled around the patient 208, and a panoramic image, a panoramic sagittal image, or the like of the patient 208 may be generated based on the captured image data. In one embodiment, the imaging device 112 may use LIDAR scanning, where the imaging device 112 acts as both an emitter and a detector, to capture a set of points associated with the patient. The processor 104 may use the captured data, along with one or more algorithms or data models (e.g., image processing 120) to generate the mesh 236. For example, the imaging processing 120 may be an algorithm that computes, based on the data (e.g., based on the set of captured points), the relative distance between the patient and the imaging device 112 at each point of the set of captured points to construct the mesh 236. In another example, the processor 104 may use a neural network or other data model trained on similar image data to generate the mesh 236.

The mesh 236 may be used as the patient size estimation when reconstructing a multidimensional volume of the patient. In some embodiments, data associated with the mesh (e.g., data associated with the boundaries of the mesh) may be overlaid or otherwise combined with the surgical scan data that is being used to perform the reconstruction of the multidimensional image, with the mesh data used as one or more criteria for the reconstruction. For example, the outer boundary formed by the mesh 236 may be used in determining what constraints (if any) should be imposed on the voxels of the volume reconstruction.

Figure 3A:
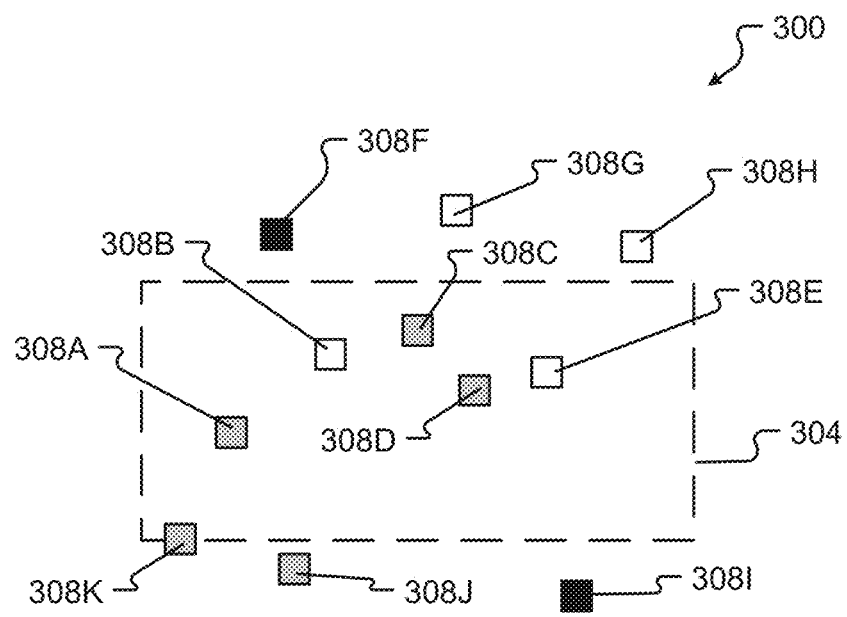
FIG. 3A depicts a first set of voxels in a reconstructed image according to at least one embodiment of the present disclosure.
Figure 3B:
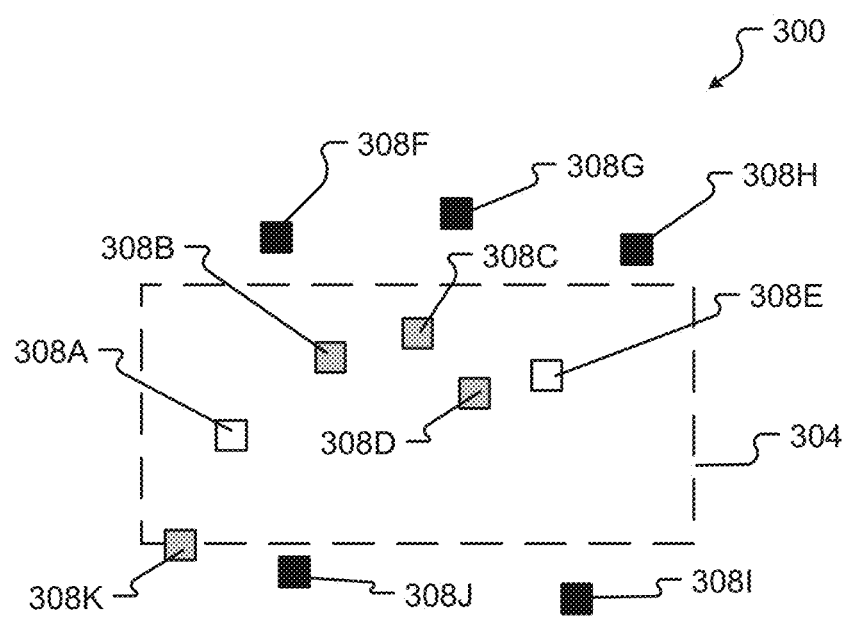
FIG. 3B depicts a second set of voxels in the reconstructed image according to at least one embodiment of the present disclosure.

FIGS. 3A-3B illustrate aspects of a reconstructed image 300 in accordance with at least one embodiment of the present disclosure. The reconstructed image 300 may be a reconstruction of a multidimensional image (e.g., a 2D image, a 3D image, etc.) of a patient, a patient's anatomy, or the like. In some embodiments, the reconstructed image 300 may be based on a preoperative and/or intraoperative scan or image of the patient 208. For example, the patient 208 may undergo a surgery or surgical procedure where preoperative images of the patient are captured and a volumetric reconstruction of the patient 208 is created. In some embodiments, the images of the patient may be dynamically captured by the robotic arms 116, with one robotic arm holding an emitter of the imaging device 112 and another robotic arm holding a detector of the imaging device 112. The volumetric reconstruction may be based on the images of the patient, and may be used for the purposes of surgical navigation (e.g., navigating the robot 114 with the navigation system 118), to assist the surgeon with planning and/or performing the surgery, or for any other reason. In some embodiments, the reconstructed image 300 may be initiated by the processor 104 using one or more algorithms or data models (e.g., reconstruction 136). The reconstruction 136 may use ART, FBP, combinations thereof, and the like to generate the reconstructed image 300. In some embodiments, the reconstruction 136 may iteratively change (e.g., increase or decrease) values of one or more voxels (e.g., a value in 3D space) that form the multidimensional image, subject to one or more criteria. FIG. 3A depicts the reconstructed image 300 after a first iteration of the reconstruction 136 (e.g., before any iterative changes to the voxels), while FIG. 3B shows the reconstructed image 300 after the reconstruction 136 has iteratively changed the values of one or more voxels (e.g., after one iteration, after two iterations, after three iterations, etc.).

The reconstructed image 300 comprises a plurality of voxels 308A-308J, including a plurality of inside voxels 308A-308E disposed inside a boundary 304 (also referred to herein as a boundary region) and a plurality of outside voxels 308A-308E that are disposed outside the boundary 304. It is to be understood that, while the reconstructed image 300 is depicted as 2D in the figures, the reconstructed image 300 provides a view of a 2D slice of the overall volumetric reconstruction in embodiments where the multidimensional image is three dimensional.

The boundary 304 may represent the estimated patient size as determined based on, for example, the thickness 220, the width 232, and/or the mesh 236. In some embodiments, the dimensions of the boundary 304 may correspond to the estimated size of the patient 208. For example, the height of the boundary 304 in FIG. 3A may have the same value as the thickness 220, and the length of the boundary 304 in FIG. 3A may have the same value as the width 232. As another example, the dimensions of the boundary 304 may correspond to the dimensions of the mesh 236. In other words, FIG. 3A depicts the estimated patient size overlaid with the plurality of voxels 308A-308J whose values can be changed during the course of reconstructing the multidimensional image. While the boundary 304 is depicted as a quadrilateral in FIGS. 3A-3B, it is to be understood that the shape used to estimate the patient size is in no way limited, and the boundary 304 based on estimated patient size may take any size, shape, or form. In some embodiments, the estimated patient size may be based on other patient records (e.g., previously-recorded patient measurements, previous images and/or scans of the patient 208, combinations thereof, etc.), with data associated with the patient records input into the reconstruction 136.

Each of the voxels may include an attenuation value. The attenuation value may reflect a propensity of the area (or volume) represented by the voxel to be penetrated by energy (e.g., radiation from an X-ray). In some embodiments, the attenuation value may be based on Hounsfield units (HU). Hounsfield units are dimensionless units universally used in CT scanning to express CT numbers in a standardized and convenient form. Hounsfield units are obtained from a linear transformation of measured attenuation coefficients. The transformations are based on the arbitrarily-assigned densities of air and pure water. For example, the radiodensity of distilled water at a standard temperature and pressure (STP) of zero degrees Celsius and 105 pascals is 0 HU; the radiodensity of air at STP is -1000 HU. While attenuation values of the voxel are discussed qualitatively (e.g., low attenuation, medium attenuation, high attenuation, etc.) and/or quantitatively (e.g., based on values in HU) herein, it is to be understood that the values of the voxels discussed herein are in no way limiting.

In FIGS. 3A-3B, increasing darkness of the voxel indicates a lesser attenuation (which may also indicate a greater propensity for energy penetration); in other words, the white voxels may have high attenuation values (e.g., attenuation values with HU greater than 700), the grey voxels may have medium attenuation values (e.g., attenuation values with HU between 100 and 700), and the black voxels may have low attenuation values (e.g., attenuation values with HU lower than 0 HU).

A first voxel 308A, a second voxel 308B, a third voxel 308C, a fourth voxel 308D, and a fifth voxel 308E may be located within the boundary 304; while a sixth voxel 308F, a seventh voxel 308G, an eighth voxel 308H, a ninth voxel 308I, and a tenth voxel 308J may be located outside of the boundary 304. While the voxels 308A-308J are illustrated as not contacting the boundary 304, in some cases one or more edges of a voxel may abut the boundary 304. In some embodiments, the reconstruction 136 may be able to identify which voxels are located within the boundary 304 and which voxels are located outside the boundary 304, and may label the voxels accordingly. In such embodiments, the reconstruction 136 may make such identifications of the voxels in the dynamically captured image data before generating the first iteration of the reconstructed image 300.

The second voxel 308B, the fifth voxel 308E, the seventh voxel 308G, and the eighth voxel 308H may each have a high attenuation value; the first voxel 308A, the third voxel 308C, the fourth voxel 308D, and the tenth voxel 308J may each have a medium attenuation value; and the sixth voxel 308F and the ninth voxel 308I may each have a low attenuation value.

As shown in FIG. 3B, the attenuation values of the one or more of the voxels 308A-308J may be adjusted during one or more iterations of the reconstruction 136, subject to one or more criteria. For example, the reconstruction 136 may decrease the attenuation value of the second voxel 308B from a high attenuation to a medium attenuation and may also increase the attenuation value of the first voxel 308A from a medium attenuation to a high attenuation. In some embodiments, the reconstruction 136 may keep the sum of all attenuation values the same (e.g., fixed) while decreasing or increasing the attenuation values of the voxels.

In some embodiments, one or more voxels may be positioned on the boundary 304 (e.g., the voxel is positioned both inside and outside the boundary 304), such as an eleventh voxel 308K. In such embodiments, the algorithm may classify the eleventh voxel 308K as being inside the boundary 304 or as being outside the boundary 304, depending on one or more parameters or other settings associated with the algorithm. For example, the algorithm may be configured such that all voxels on the boundary 304 are classified as being included within the boundary 304. In other cases, the algorithm may classify all voxels on the boundary as being outside the boundary 304. In some embodiments, sub-voxel (or sub-pixel when the multidimensional image being reconstructed is 2D) resolution interpolation may be performed to estimate what percentage of the voxel (or pixel) is located within the boundary 304. When more than half of the voxel is within the boundary 304 (e.g., the percentage is above 50%), the algorithm may classify the voxel as being within the boundary 304, and when more than half the voxel is outside the boundary 304, the algorithm may classify the voxel as being outside the boundary 304.

The one or more criteria may be based on the patient size estimation, the attenuation values of one or more voxels, combinations thereof, and the like. In one embodiment, one or more criteria may be based on the boundary 304. For example, one criterion may comprise that voxels located outside the boundary 304 cannot have the attenuation value increased beyond a threshold value (e.g., a threshold value associated with an attenuation value of skin). As another example, one criterion may comprise that the difference between the attenuation value of a voxel outside the boundary 304 and the attenuation value of a voxel inside the boundary 304 must be above a threshold value. As yet another example, one criterion may comprise that the voxels outside the boundary 304 must be adjusted toward a target ratio of attenuation of the voxels outside the boundary 304 relative to attenuation of the voxels inside the boundary 304 (or vice versa).

In some embodiments, the reconstruction 136 may be unable to satisfy the one or more criteria, or otherwise may be unable to generate the reconstructed image 300. For example, the criteria may impose restraints on the voxels outside the boundary 304 that result in no possible solution for adjusting the attenuation values of the voxels while also keeping the sum of the attenuation values constant. In another example, the image data used by the reconstruction 136 may contain insufficient image data (e.g., due to corrupted image data) for the reconstruction 136 to generate the reconstructed image 300. As yet another example, the boundary 304 (based on the patient size estimation) may be inaccurate (e.g., the boundary is too big, the boundary is too small, etc.), resulting in too few voxels outside or inside the boundary 304. In such cases, the reconstruction 136 may return an error message or other indicator that the one or more criteria cannot be met. As a result, additional images of the patient may be taken and/or additional information associated with the patient may be retrieved (e.g., from the database 130) and used to create a new patient size estimation. In other embodiments, the original image data used to generate the initial patient size estimation may be reused, but the parameters of the algorithms and/or data models used to generate the size estimation (e.g., mesh-generating algorithms/data models, edge detection algorithms/data models, etc.) may be changed, adjusted, or otherwise tuned to produce a new patient size estimation. The new patient size estimation may then be used (e.g., in the form of a new boundary 304) in the reconstruction 136 to create the multidimensional image.

As illustrated in FIG. 3B, the one or more criteria may result in a decrease in attenuation values of the voxels outside the boundary 304. In other words, the reconstruction 136 may treat the voxels outside the boundary 304 as unassociated with the patient 208 or, stated different, associated with the environment around the patient 208. The environment (e.g., air) has a different attenuation value than the patient anatomy. By introducing the boundary 304 (which corresponds to the estimated patient size), the reconstruction 136 can more efficiently and accurately reconstruct the patient volume. In other words, by applying the one or more criteria to the voxels outside the boundary 304 (and/or, in some embodiments, to the voxels inside the boundary 304), the attenuation values of the voxels not associated with patient anatomy are reduced or otherwise distinguished from the patient anatomy. This allows the reconstruction 136 and, when the reconstructed image 300 is rendered to a display, the surgeon to more easily distinguish between patient anatomy and non-patient anatomy. Similarly, the reconstructed image 300 may provide a more accurate representation of the space occupied by the patient 208 than if the reconstructed image 300 were reconstructed without the boundary 304 (and by extension the a priori data related to patient size), enabling improved navigation of the robot 114 and/or the robotic arm 116 relative to the patient 208.

Figure 4:
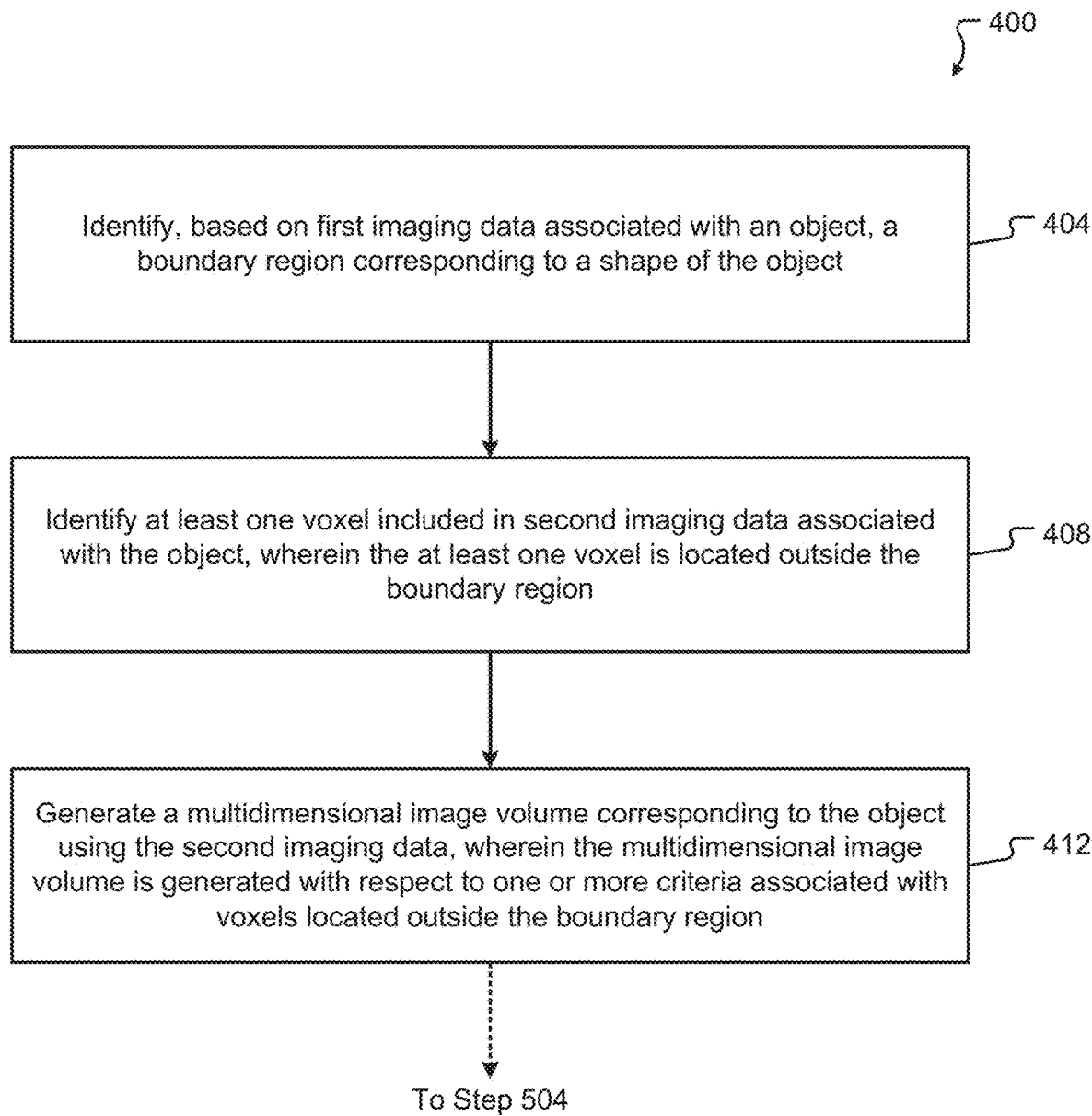
FIG. 4 is a flowchart according to at least one embodiment of the present disclosure.

FIG. 4 depicts a method 400 that may be used, for example, to reconstruct an image volume incorporating an a priori patient size estimation.

The method 400 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform the method 400 by executing elements stored in a memory such as the memory 106. The elements stored in memory and executed by the processor may cause the processor to execute one or more steps of a function as shown in method 400. One or more portions of a method 400 may be performed by the processor executing any of the contents of memory, such as an image processing 120, a segmentation 122, a transformation 124, a registration 128, and/or a reconstruction 136.

The method 400 comprises identifying, based on first imaging data associated with an object, a boundary region corresponding to a shape of an object (step 404). The first imaging data may be obtained from one or more images captured using one or more imaging devices (e.g., imaging devices 112). In one embodiment, the imaging data may be identified from one or more CT scans, MRI scans, fluoroscopy scans, LIDAR scans, combinations thereof, and the like. The object may be or comprise a patient or one or more portions of the patient (e.g., anatomical elements). The boundary region may be determined based on, for example, a mesh generated based on the imaging data, an estimated thickness and width of the patient (that may be based on a width and thickness of the patient as depicted in one or more images), combinations thereof, and the like. In some embodiments, the boundary region may be determined based on one or more algorithms and/or data models that use, for example, edge detection to identify the boundary region in the first imaging data. The edge detection may identify different portions (e.g., upper and lower portions) of the first imaging data, and determine air edges (e.g., edges where the image changes from depicting patient anatomy to depicting air or other environment surrounding the patient). In some embodiments, the air edges may be used to define the boundaries of the patient.

The method 400 also comprises identifying at least one voxel included in second imaging data associated with the object, wherein the at least one voxel is located outside the boundary region (step 408). The second imaging data may be associated with a scan or other image generated by the one or more imaging devices during the course of a surgery or surgical procedure. The second imaging data may be based on data generated, for example, by emitters and detectors affixed to the robotic arms that are dynamically navigated around the patient. The second imaging data may be used (e.g., as a base or initial guess) in an iterative algorithm or data model to generate a volumetric reconstruction representing the volume occupied by the patient. The second imaging data may include a plurality of voxels that include attenuation values (e.g., HU values), and the boundary region may be combined with the second imaging data (e.g., the boundary may be overlaid on the second imaging data) such that the voxels are separated into two groups of voxels: voxels located within the boundary region and voxels located outside the boundary region. The step 408 may identify each voxel of the plurality of voxels, including the voxels inside the boundary region and the voxels outside the boundary region. In some embodiments, the combined imaging data (e.g., the second imaging data and the overlaid boundary region), as well as the identified voxels, may be rendered to a display.

The method 400 also comprises generating a multidimensional image volume corresponding to the object using the second imaging data, wherein the multidimensional image volume is generated with respect to one or more criteria associated with voxels located outside the boundary region (step 412). In some embodiments, the multidimensional image volume may be similar to or the same as the reconstructed image 300. The multidimensional image volume may depict a 3D model of the volume occupied by the object (e.g., the patient). The step 412 may generate the multidimensional image volume based on the one or more criteria using, for example, one or more iterative algorithms and/or data models (e.g., ART, MLEM, OSEM, FBP, combinations thereof, etc.).

In some embodiments, the one or more criteria may comprise a threshold attenuation value associated with one or more voxels located outside the boundary region. For example, the one or more criteria may comprise limiting the sum of the attenuation values of all voxels located outside the boundary region to a threshold value. As another example, the one or more criteria may comprise that voxels located outside the boundary region cannot have the attenuation value increased beyond a threshold value (e.g., a threshold value associated with an attenuation value of skin).

In some embodiments, the one or more criteria may be based on the attenuation values of the voxels outside the boundary region relative to the attenuation values of the voxels inside the boundary region. For example, the one or more criteria may comprise that a difference between the attenuation value of a voxel outside the boundary region and the attenuation value of a voxel inside the boundary region must be above a threshold value. As another example, the one or more criteria may comprise that the voxels outside the boundary region must be adjusted toward a target ratio of attenuation of the voxels outside the boundary region relative to attenuation of the voxels inside the boundary region (or vice versa). In other words, the attenuation values of voxels outside the boundary region, when summed and divided by the sum of attenuation values of voxels inside the boundary region (or alternatively, the inverse of such a value), must be below (or alternatively above) a threshold value.

In some embodiments, the method 400 may optionally continue to step 504. In other embodiments, the method 400 may end after the step 412.

The present disclosure encompasses embodiments of the method 400 that comprise more or fewer steps than those described above, and/or one or more steps that are different than the steps described above.

Figure 5:
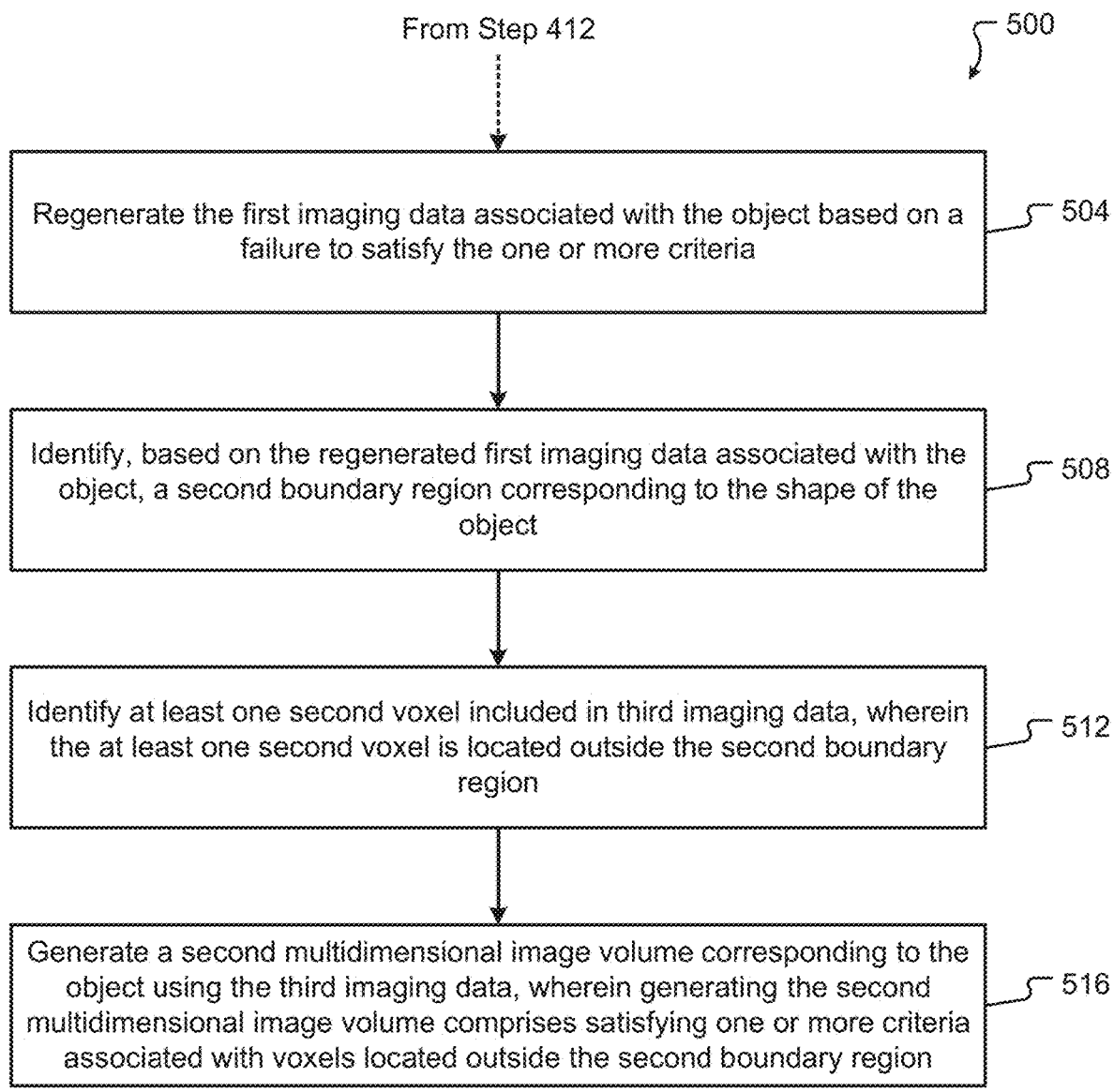
FIG. 5 is a flowchart according to at least one embodiment of the present disclosure.

FIG. 5 depicts a method 500 that may be used, for example, to adjust the boundary region when generating a multidimensional image volume.

The method 500 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 500. The at least one processor may perform the method 500 by executing elements stored in a memory such as the memory 106. The elements stored in memory and executed by the processor may cause the processor to execute one or more steps of a function as shown in method 500. One or more portions of a method 500 may be performed by the processor executing any of the contents of memory, such as an image processing 120, a segmentation 122, a transformation 124, a registration 128, and/or a reconstruction 136.

The method 500 comprises regenerating the first image data associated with the object based on a failure to satisfy the one or more criteria (step 504). The step 504 may follow from the step 412, where an object's boundary region was determined and a multidimensional image volume was generated based on one or more criteria.

In the step 504, the one or more criteria may not be satisfied when the multidimensional image volume was generated. For example, the criteria may impose restraints on the voxels outside the boundary region that result in no possible solution for adjusting the attenuation values of the voxels while also keeping the sum of the attenuation values constant. In another example, the image data may contain insufficient image data (e.g., due to corrupted image data) to accurately generate the multidimensional image volume. As yet another example, the boundary region (based on the patient size estimation) may be inaccurate (e.g., the boundary region is too big, the boundary region is too small, etc.), resulting in too few voxels outside or inside the boundary region.

The step 504 may regenerate the first imaging data by causing additional images of the patient to be taken and/or additional information associated with the patient to be retrieved (e.g., from the database 130) and used to create a new patient size estimation. In other embodiments, the original image data used to generate the initial patient size estimation may be reused, but the parameters of the algorithms and/or data models used to generate the size estimation (e.g., mesh-generating algorithms/data models, edge detection algorithms/data models, etc.) may be changed, adjusted, or otherwise tuned to produce a new patient size estimation. The new patient size estimation may then be used as the second boundary region to create the multidimensional image.

The method 500 also comprises identifying, based on the regenerated first imaging data associated with the object, a second boundary region corresponding to the shape of the object (step 508). In some embodiments, the step 508 may be similar to or the same as the step 404. The step 508 may use one or more algorithms and/or data models (e.g., reconstruction 136) to identify the second boundary region in the regenerated first imaging data.

The method 500 also comprises identifying at least one second voxel included in third imaging data, wherein the at least one second voxel is located outside the second boundary region (step 512). In some embodiments, the step 512 may be similar to the step 408. The step 512 may use one or more algorithms and/or data models (e.g., reconstruction 136) to identify the voxels inside and outside the second boundary region when the second boundary region is combined with the third imaging data. In some embodiments, the third imaging data may be or comprise the first imaging data, while in other embodiments the third imaging data may be based on dynamically captured images and/or scans of the patient taken preoperatively and/or intraoperatively.

The method 500 also comprises generating a second multidimensional image volume corresponding to the object using the third imaging data, wherein generating the second multidimensional image volume comprises satisfying one or more criteria associated with voxels located outside the second boundary region (step 516). In some embodiments, the step 516 may be similar to or the same as the step 412. The step 516 may use one or more algorithms and/or data models (e.g., reconstruction 136) to generate the second multidimensional image volume. In some embodiments, the second boundary region may be different from the initial boundary region, resulting in the reconstruction 136 being able to satisfy the one or more criteria when generating the second multidimensional image volume.

The present disclosure encompasses embodiments of the method 500 that comprise more or fewer steps than those described above, and/or one or more steps that are different than the steps described above.

As noted above, the present disclosure encompasses methods with fewer than all of the steps identified in FIGS. 4 and 5 (and the corresponding description of the methods 400 and 500), as well as methods that include additional steps beyond those identified in FIGS. 4 and 5 (and the corresponding description of the methods 400 and 500). The present disclosure also encompasses methods that include one or more steps from one method described herein, and one or more steps from another method described herein. Any correlation described herein may be or include a registration or any other correlation.

The foregoing is not intended to limit the disclosure to the form or forms disclosed herein. In the foregoing Detailed Description, for example, various features of the disclosure are grouped together in one or more aspects, implementations, and/or configurations for the purpose of streamlining the disclosure. The features of the aspects, implementations, and/or configurations of the disclosure may be combined in alternate aspects, implementations, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, implementation, and/or configuration. Thus, the following claims are hereby incorporated into this Detailed Description, with each claim standing on its own as a separate preferred implementation of the disclosure.

Moreover, though the foregoing has included description of one or more aspects, implementations, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, implementations, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

It is to be appreciated that any feature described herein can be claimed in combination with any other feature(s) as described herein, regardless of whether the features come from the same described implementation.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an implementation that is entirely hardware, an implementation that is entirely software (including firmware, resident software, micro-code, etc.) or an implementation combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A system, comprising:
a processor; and
a memory storing instructions thereon that, when executed by the processor, cause the processor to:
identify, based on first imaging data associated with an object, a boundary region corresponding to a shape of the object;
identify at least one voxel included in second imaging data associated with the object, wherein the at least one voxel is located outside the boundary region; and
generate a multidimensional image volume corresponding to the object using the second imaging data, wherein generating the multidimensional image volume is with respect to one or more criteria associated with voxels located outside the boundary region, and wherein the one or more criteria comprise a target ratio of attenuation of voxels located outside the boundary region to attenuation of voxels located inside the boundary region.

2. The system of claim 1, wherein the instructions are further executable by the processor to:
regenerate the first imaging data associated with the object based on a failure to satisfy the one or more criteria;
identify, based on the regenerated first imaging data associated with the object, a second boundary region corresponding to the shape of the object;
identify at least one second voxel included in third imaging data, wherein the at least one second voxel is located outside the second boundary region; and
generate a second multidimensional image volume corresponding to the object using the third imaging data, wherein generating the second multidimensional image volume comprises satisfying one or more criteria associated with voxels located outside the second boundary region.

3. The system of claim 1, wherein the one or more criteria comprise a threshold attenuation value associated with voxels located outside the boundary region.

4. The system of claim 1, wherein the instructions are further executable by the processor to:
identify, based on the second imaging data associated with the object, a second voxel located inside the boundary region,
wherein the one or more criteria comprises satisfying a threshold difference between a first attenuation value of the at least one voxel and a second attenuation value of the second voxel.

5. The system of claim 1, wherein the first imaging data comprises one or more panoramic sagittal images of the object.

6. The system of claim 1, wherein:
the first imaging data comprises one or more images including the object;
an upper portion of the one or more images comprises a first air edge corresponding to a boundary of the object; and
a lower portion of the one or more images comprises a second air edge corresponding to another boundary of the object.

7. The system of claim 1, wherein the instructions are further executable by the processor to:
capture a set of points associated with the object using one or more light-based ranging operations; and
generate the first imaging data associated with the object based on the set of points.

8. The system of claim 1, wherein the first imaging data comprises one or more x-ray images, one or more optical images, one or more depth images, one or more magnetic resonance imaging (MRI) images, one or more computed tomography (CT) images, or a combination thereof.

9. The system of claim 1, wherein the instructions are further executable by the processor to capture the first imaging data associated with the object,
wherein capturing the first imaging data comprises:
capturing a first image of the object, wherein capturing the first image is in association with first pose information of an imaging device with respect to the object; and
capturing a second image of the object, wherein capturing the second image is in association with second pose information of the imaging device with respect to the object,
wherein identifying the boundary region corresponding to the shape of the object is based on the first image, the first pose information, the second image, and the second pose information.

10. The system of claim 1, wherein dimensions of the boundary region correspond to at least one of:
a dimension of the object in a first direction with respect to a plane; and
a second dimension of the object in a second direction with respect to the plane, wherein the second direction is orthogonal to the first direction.

11. The system of claim 1, wherein the instructions are further executable by the processor to:
dynamically capture the second imaging data using one or more imaging devices.

12. A system, comprising:
one or more imaging devices;
a processor; and
a memory storing data thereon that, when processed by the processor, cause the processor to:
identify, based on first imaging data generated using the one or more imaging devices, a boundary region corresponding to a shape of an object;

identify at least one voxel included in second imaging data generated using the one or more imaging devices, wherein the at least one voxel is located outside the boundary region; and generate a multidimensional image volume corresponding to the object using the second imaging data, wherein generating the multidimensional image volume is with respect to one or more criteria associated with voxels located outside the boundary region, and wherein the one or more criteria comprise a target ratio of attenuation of the voxels located outside the boundary region to attenuation of voxels located inside the boundary region.

13. The system of claim 12, wherein the data are further executable by the processor to:

regenerate the first imaging data in response to a failure to satisfy the one or more criteria;

identify, based on the regenerated first imaging data, a second boundary region corresponding to the shape of the object;

identify at least one second voxel included in third imaging data, wherein the at least one second voxel is located outside the second boundary region; and generate a second multidimensional image volume corresponding to the object using the third imaging data, wherein generating the second multidimensional image volume comprises satisfying one or more criteria associated with voxels located outside the second boundary region.

14. The system of claim 12, wherein the one or more criteria comprise a threshold attenuation value associated with voxels located outside the boundary region.

15. The system of claim 12, wherein the data are further executable by the processor to:

identify, based on the second imaging data associated with the object, a second voxel located inside the boundary region, wherein the one or more criteria comprises a threshold difference between a first attenuation value of the at least one voxel and a second attenuation value of the second voxel.

16. The system of claim 12, wherein the first imaging data comprises one or more panoramic sagittal images of the object.

17. The system of claim 12, wherein:

the first imaging data comprises one or more images including the object;

an upper portion of the one or more images comprises a first air edge corresponding to a boundary of the object; and a lower portion of the one or more images comprises a second air edge corresponding to another boundary of the object.

18. A method, comprising:

identifying, based on first imaging data associated with an object, a boundary region corresponding to a shape of the object;

identifying at least one voxel included in second imaging data associated with the object, wherein the at least one voxel is located outside the boundary region; and generating a volumetric construction corresponding to the object using the second imaging data, wherein generating the volumetric construction is with respect to satisfying one or more criteria associated with voxels located outside the boundary region, and wherein the one or more criteria comprise a target ratio of attenuation of the voxels located outside the boundary region to attenuation of voxels located inside the boundary region.

19. The method of claim 18, wherein the first imaging data comprises one or more x-ray images, one or more optical images, one or more depth images, one or more magnetic resonance imaging (MRI) images, one or more computed tomography (CT) images, or a combination thereof.

20. The method of claim 18, further comprising:

dynamically capturing the second imaging data using one or more imaging devices.

* * * * *